J. B. McMILLION.
RESILIENT WHEEL.
APPLICATION FILED MAR. 29, 1918.

1,277,971.

Patented Sept. 3, 1918.
2 SHEETS—SHEET 1.

Witnesses

Inventor
J. B. McMillion

By
D. Swift & Co.
Attorneys

J. B. McMILLION.
RESILIENT WHEEL.
APPLICATION FILED MAR. 29, 1918.

1,277,971.

Patented Sept. 3, 1918.
2 SHEETS—SHEET 2.

Witnesses

Inventor
J. B. McMillion
By D. Swift & Co.
Attorneys

UNITED STATES PATENT OFFICE.

JOSIAH B. McMILLION, OF MONMOUTH, ILLINOIS.

RESILIENT WHEEL.

1,277,971.  Specification of Letters Patent.  Patented Sept. 3, 1918.

Application filed March 29, 1918.  Serial No. 225,469.

*To all whom it may concern:*

Be it known that I, JOSIAH B. McMILLION, a citizen of the United States, residing at Monmouth, in the county of Warren, State of Illinois, have invented a new and useful Resilient Wheel; and I do hereby declare the following to be a full, clear, and exact description of the invention, such as will enable others skilled in the art to which it appertains to make and use the same.

This invention relates to an improved resilient wheel, and one of the objects of the invention is the provision of a felly, and an improved rim for the tire and being spaced from the felly and provided with yieldable connections therewith, so that the felly may move yieldably toward and from the rim incident to the load on the axle.

A further object of the invention is to provide a sectional rim for the tire, said sections of the rim being linked together and having yieldable connections with the felly of the wheel, whereby the sections are supported in proper position, and whereby the felly may move toward said sections incident to the load being applied on the axle.

A further object of the invention is the provision of a plurality of rim sections, and means for supporting the rim sections on the felly, whereby the sections may yield or move during the revoluble action of the wheel.

One of the features of the invention is to construct each rim section in two parts, one arching the other and connected thereto and adapted to support the tire, the other being supported on the felly and spaced therefrom.

Another feature of the invention is the provision of means to permit the felly at diametrically opposite portions thereof, and as a whole to move, when the felly moves vertically incident to the load on the axle.

In practical fields the details of construction may necessitate alterations falling within the scope of what is claimed.

The invention comprises further features and combination of parts as hereinafter set forth shown in the drawings and claimed.

In the drawings:—

Figure 1:
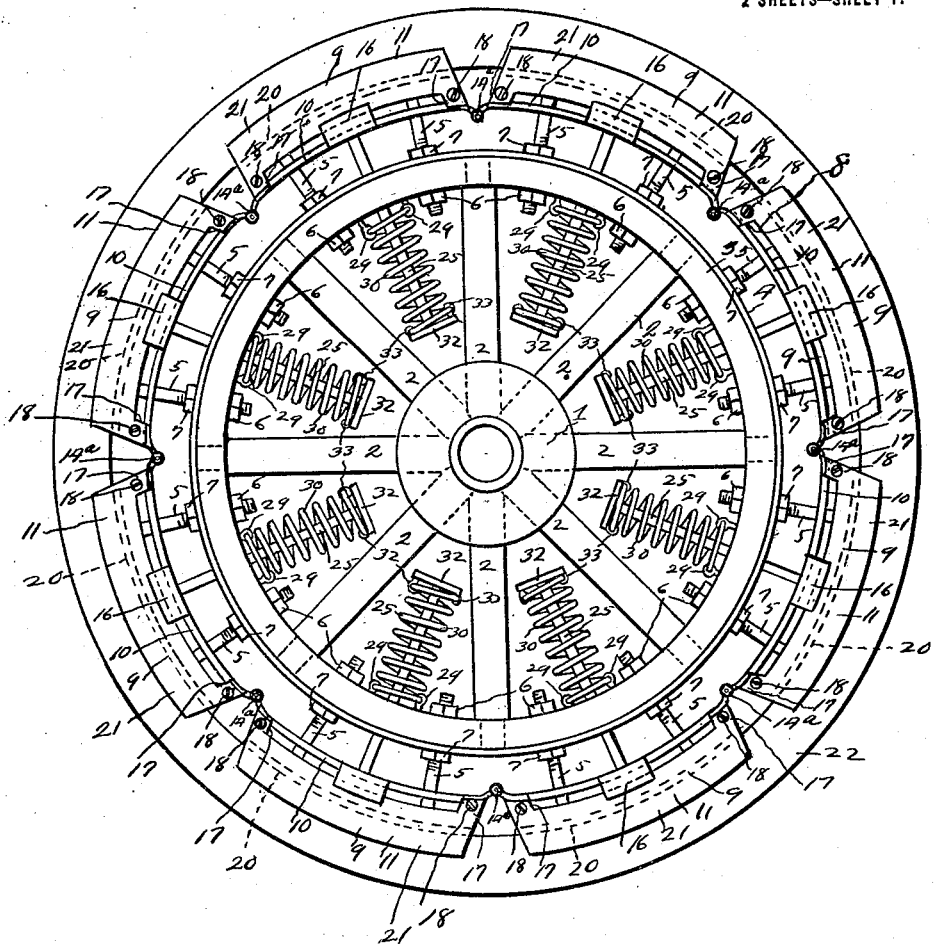
Figure 1 is a view in side elevation of the improved resilient wheel constructed in accordance with the invention.
Figure 2:
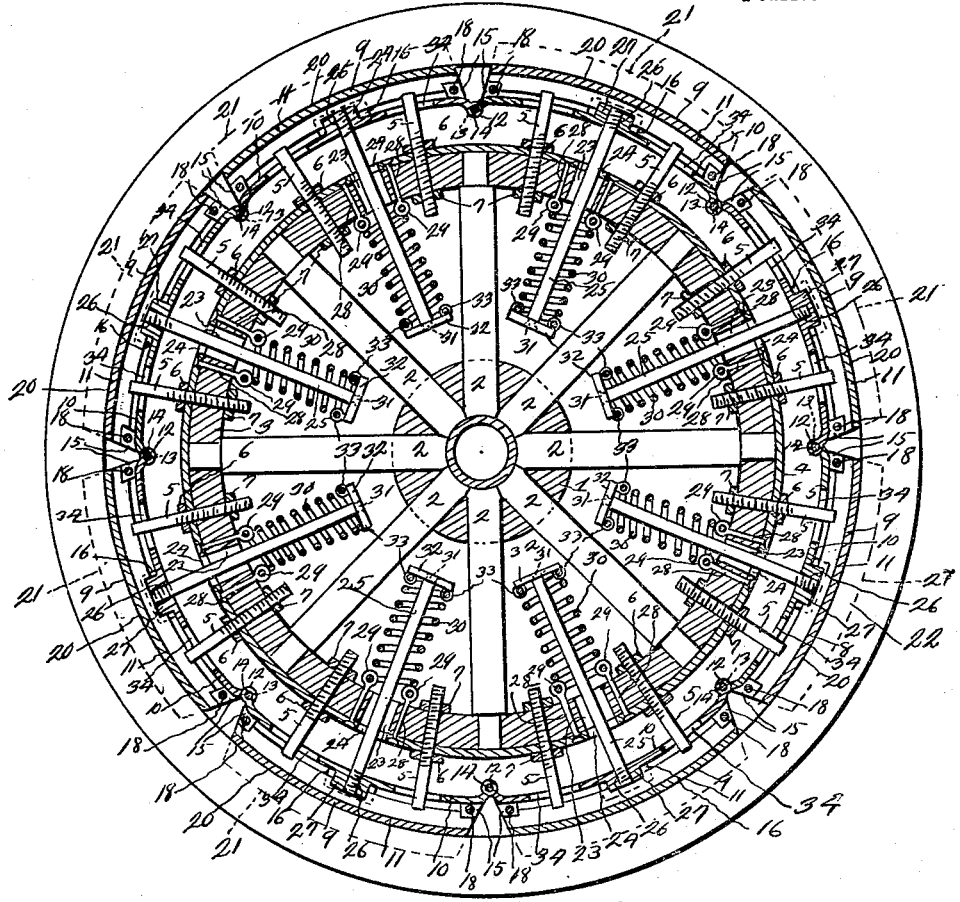
Fig. 2 is a vertical sectional view.
Figure 3:
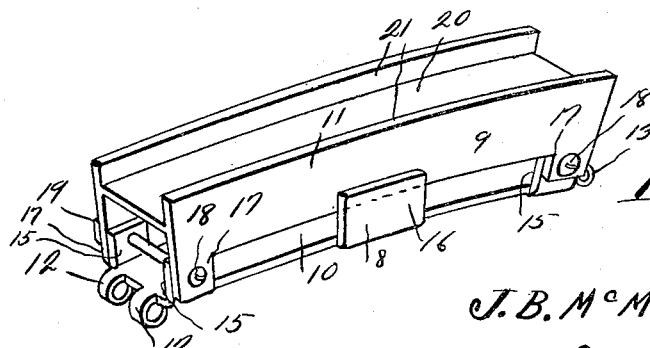
Fig. 3 is an enlarged detail perspective view of one of the rim sections.

Referring more especially to the drawings 1 designates the usual hub, to which the spokes 2 are connected. The spokes 2 are connected to the felly 3, and engaging the outer face of the felly is an annular band 4. Bolts 5 extend through the felly and the band, there being nuts 6 and 7 on the inner and outer faces of the felly and the band and threaded to the bolts 5, for holding the bolts securely in place. A rim 8 is provided and is arranged spaced from the band 4, and comprises a plurality of sections 9. These sheet metal sections each consists of the parts 10 and 11. The adjacent ends of the parts 10 of the sections are provided with interengaging loops or rolls or sleeves 12 and 13. In other words one end of the part 10 carries the rolls or sleeves 12, and the other end of the part 10 carries the roll 13. Therefore it will be observed that the roll 13 of one end of the part 10 of the section will engage between the rolls 12 of an opposite end of an adjacent part 10 of an adjacent section. Suitable bolts 14 extend through the rolls 12 and 13, and their ends are provided with nuts 14ª, thereby pivotally uniting the sections of the rim in sequence about the band of the felly and in spaced relations thereto. The part 10 of each section is provided with radially extending ears 15 and 16. The part 11 of each section has inwardly extending radial ears 17, which are designed to overlap the outer faces of the ears 15. Bolts 18 pass through the ears 15 and 17 and have nuts 19, thereby connecting the parts 10 and 11 of each section together. The ears 16 engage on the outer faces of the walls of the part 11, so as to reinforce the part 11 in its position. In cross section the part 11 is I-shaped and a channel 20 between the flanges 21 of each part is designed to receive a suitable tire 22, which may be constructed of any suitable material, either rubber or a composition of rubber and canvas. In the latter case the tire may be provided with a coating of rubber. The felly and the band are provided with registering slots 23 and 24, through which the rods or bolts 25 radially extend, and the outer ends of these rods or bolts are threaded into openings 26 of the enlargements 27 of the central portions of the parts 10 of said sections. Suitable pins 28 are carried by the felly and the band and provided with eyes 29. There is a pair of these pins 28 adjacent each of the slots 23, and coil springs 30, are each in surrounding relation with and on one of the bolts or rods 25. The outer convolution of each coil spring extends through the eyes 29, thereby anchoring the outer end part of the spring. The convolutions of each spring 30 are normally close together and secured in any suitable manner as at 31 to the inner end of each rod or bolt 25 is a disk 32 having eyes 33, through which the innermost convolution of the spring extends, thereby anchoring the inner end part of the spring 30 to the disk 32. It will be seen that by means of the springs 30 tension is exerted, to hold the sectional rim in a spaced relation from the band 4 of the felly. By virtue of the slots 23 and 24 it is to be seen that there is free movement of the rods or bolts 25, as well as free movement of the felly section of the wheel. Each part 10 of each section is provided with elongated slots 34, for the reception of the outer end portions of the bolts 5. By the outer ends of the bolts 5 engaging through the slots 34, excessive lateral movement of the sections of the rim is prevented, and since the sections are connected to the felly as shown, said sections are each given a tilting action, during the revoluble movement of the wheel. The sections in receiving this movement are guided by and maintained in place by means of the bolts 5 engaging said slots 34.

The invention having been set forth what is claimed as new and useful is:—

In a resilient wheel, a felly, a hub having spoke connections with the felly, said felly having radial elongated slots, a rim in surrounding relation to and spaced from the felly, said rim comprising a plurality of sections, means for pivotally uniting said sections sequentially, said sections having bolts extending through the slots of the felly and having their inner ends provided with spring tensioning means connected to the felly, whereby the felly may move toward the rim incident to the weight of the load on said hub, said sections, each comprising two parts, an inner part and an outer part, means connecting the two parts, the inner part having elongated slots, and means carried by the felly extending through the slots of the inner parts for guiding and steadying the inner parts in their positions.

In testimony whereof I have signed my name to this specification in the presence of two subscribing witnesses.

JOSIAH B. McMILLION.

Witnesses:
C. G. JENKS,
EVA HAYS.

Copies of this patent may be obtained for five cents each, by addressing the "Commissioner of Patents, Washington, D. C."